(12) United States Patent
Dowling

(10) Patent No.: US 12,136,445 B2
(45) Date of Patent: Nov. 5, 2024

(54) USER INTERFACE FOR VIDEO EDITING SYSTEM

(71) Applicant: Blackmagic Design Pty Ltd, Port Melbourne (AU)

(72) Inventor: Matthew Dowling, Port Melbourne (AU)

(73) Assignee: Blackmagic Design Pty Ltd, South Melbourne (AU)

(*) Notice: Subject to any disclaimer, the term of this patent is extended or adjusted under 35 U.S.C. 154(b) by 0 days.

(21) Appl. No.: 17/600,966

(22) PCT Filed: Apr. 1, 2020

(86) PCT No.: PCT/AU2020/050320
§ 371 (c)(1),
(2) Date: Oct. 1, 2021

(87) PCT Pub. No.: WO2020/198792
PCT Pub. Date: Oct. 8, 2020

(65) Prior Publication Data
US 2022/0189511 A1    Jun. 16, 2022

(30) Foreign Application Priority Data
Apr. 1, 2019   (AU) .............................. 2019901099

(51) Int. Cl.
*G11B 27/34*    (2006.01)
*G06F 3/0481*   (2022.01)
(Continued)

(52) U.S. Cl.
CPC ............ *G11B 27/34* (2013.01); *G06F 3/0481* (2013.01); *G06F 3/04845* (2013.01); *G11B 27/102* (2013.01)

(58) Field of Classification Search
CPC .. G06F 3/0481; G06F 3/04845; G11B 27/102
See application file for complete search history.

(56) References Cited

U.S. PATENT DOCUMENTS

| 5,519,828 A | 5/1996 | Rayner |
| 6,404,978 B1 | 6/2002 | Abe |

(Continued)

FOREIGN PATENT DOCUMENTS

| JP | 11-289512 A | 10/1999 |
| JP | 2005-51491 A | 2/2005 |

(Continued)

OTHER PUBLICATIONS

Blackmagicdesign Reference Manual "DaVinci Resolve 14.3", Jan. 2018, 1346 pgs.

(Continued)

*Primary Examiner* — Sunghyoun Park
(74) *Attorney, Agent, or Firm* — Seed IP Law Group LLP

(57) ABSTRACT

Methods, systems and software products for video editing systems are disclosed herein. The software product includes a computer readable medium storing instructions which, when executed by a processors, cause the processor to display a graphical user interface for a video editing system, the graphical user interface including first and second spaced apart timelines, and responsive to detecting a user interaction with one of the timelines, apply a corresponding interaction to the other timeline.

22 Claims, 6 Drawing Sheets

(51) Int. Cl.
*G06F 3/04845* (2022.01)
*G11B 27/10* (2006.01)

(56) References Cited

U.S. PATENT DOCUMENTS

| | | | |
|---|---|---|---|
| 7,805,678 | B1 | 9/2010 | Niles et al. |
| 8,126,312 | B2 | 2/2012 | Bushell et al. |
| 8,363,055 | B1 | 1/2013 | Gregory et al. |
| 8,621,355 | B2 | 12/2013 | Eppolito et al. |
| 8,966,367 | B2 | 2/2015 | Meaney et al. |
| 9,996,615 | B2 | 6/2018 | Silvestri et al. |
| 10,372,306 | B2 | 8/2019 | Pendergast et al. |
| 10,692,536 | B1 | 6/2020 | Johnson |
| 2001/0040592 | A1 | 11/2001 | Foreman et al. |
| 2002/0172498 | A1 | 11/2002 | Esenyan et al. |
| 2003/0142124 | A1 | 7/2003 | Takata et al. |
| 2004/0071441 | A1 | 4/2004 | Foreman et al. |
| 2006/0224940 | A1 | 10/2006 | Lee |
| 2007/0162857 | A1 | 7/2007 | Weber et al. |
| 2008/0253735 | A1 | 10/2008 | Kuspa et al. |
| 2009/0006368 | A1 | 1/2009 | Mei et al. |
| 2009/0087161 | A1 | 4/2009 | Roberts et al. |
| 2010/0281372 | A1* | 11/2010 | Lyons ............... G06F 3/0486 715/720 |
| 2010/0281384 | A1 | 11/2010 | Lyons et al. |
| 2012/0198317 | A1 | 8/2012 | Eppolito et al. |
| 2012/0206653 | A1 | 8/2012 | Graves et al. |
| 2012/0210219 | A1 | 8/2012 | Agnoli et al. |
| 2013/0073964 | A1 | 3/2013 | Meaney et al. |
| 2013/0104042 | A1 | 4/2013 | Meaney et al. |
| 2013/0120313 | A1 | 5/2013 | Sakuragi et al. |
| 2013/0121668 | A1* | 5/2013 | Meaney ........... H04N 21/21805 386/282 |
| 2013/0125000 | A1 | 5/2013 | Fleischhauer et al. |
| 2014/0115477 | A1 | 4/2014 | Pendergast et al. |
| 2014/0143671 | A1 | 5/2014 | Kovalick |
| 2015/0121437 | A1 | 4/2015 | Tan |
| 2015/0243325 | A1 | 8/2015 | Pacurariu et al. |
| 2016/0019935 | A1* | 1/2016 | Adam ................ H04N 7/181 386/223 |
| 2016/0155455 | A1* | 6/2016 | Ojanperä ............ G10L 25/81 381/56 |
| 2016/0225405 | A1 | 8/2016 | Matias et al. |
| 2016/0274743 | A1* | 9/2016 | Sica .................. G11B 27/309 |
| 2017/0192621 | A1 | 7/2017 | Leem et al. |
| 2017/0208348 | A1* | 7/2017 | Cheng ............... H04N 21/84 |
| 2017/0244959 | A1 | 8/2017 | Ranjeet et al. |
| 2017/0300189 | A1* | 10/2017 | Pendergast ......... G11B 27/34 |
| 2018/0018510 | A1* | 1/2018 | Williams ........... G11B 27/10 |
| 2018/0255332 | A1 | 9/2018 | Heusser |
| 2018/0336931 | A1 | 11/2018 | Tandon et al. |
| 2018/0358049 | A1* | 12/2018 | Latulipe ............ G06Q 10/101 |
| 2019/0235741 | A1* | 8/2019 | Junee ................ G11B 27/034 |
| 2019/0313144 | A1* | 10/2019 | Stokking .......... H04N 21/21805 |
| 2020/0174649 | A1 | 6/2020 | Diu |
| 2020/0311682 | A1* | 10/2020 | Olshansky ............ G06V 20/40 |
| 2021/0065746 | A1 | 3/2021 | Sugano et al. |
| 2023/0353842 | A1 | 11/2023 | Maze et al. |
| 2024/0079032 | A1 | 3/2024 | Roberts et al. |

FOREIGN PATENT DOCUMENTS

| | | |
|---|---|---|
| JP | 2013-105395 A | 5/2013 |
| WO | 2007/082167 A2 | 7/2007 |
| WO | 2020/198793 A1 | 10/2020 |

OTHER PUBLICATIONS

Blackmagicdesign Reference Manual "DaVinci Resolve 15", Aug. 2018, 2632 pgs.
Saccone, P. et al., Blackmagicdesign "The Definitive Guide to DaVinci Resolve 15" 2019, 407 pgs.
Blackmagicdesign Reference Manual "DaVinci Resolve", Aug. 2020, 3590 pgs.
Extended European Search Report for EP Application No. 21207315.9, dated Apr. 8, 2022, 10 pgs.
Written Opinion of the International Searching Authority for Application No. PCT/AU2020/050322 dated Jun. 9, 2020, 7 pgs.
International Search Report for Application No. PCT/AU2020/050322 dated Jun. 9, 2020, 8 pgs.
International Search Report for Application No. PCT/AU2020/050795 dated Oct. 12, 2020, 7 pgs.
Written Opinion for International Search Report for Application No. PCT/AU2020/050795 dated Oct. 12, 2020, 4 pgs.
Written Opinion of the International Searching Authority for Application No. PCT/AU2020/050320 dated Jun. 3, 2020, 4 pgs.
International Search Report for Application No. PCT/AU2020/050320 dated Jun. 3, 2020, 4 pgs.
Sengstack, J. "Edit sequences in the Premiere Pro Source Monitor into other sequences", Mar. 18, 2013, 6 pages.
Blackmagic Design "Blackmagic Design Announces DaVinci Resolve 16", Apr. 8, 2019, 2 pages.
Extended European Search Report for EP Application No. 20781753.7 dated Nov. 25, 2022, 10 pages.
Extended European Search Report for European Application No. 20850686.5 dated Jun. 21, 2023, 12 pages.
First Chinese Office Action for Chinese Application No. 202080035245.1 dated May 23, 2023, 9 pages.
Apple Inc., "How to use the Canvas" Final Cut Pro 7 User Guide ("Final Cut Pro 7", 2010, https://prohelp.apple.com/finalcutpro_help-r01/English/en/finalcutpro/usermanual/index.html#chapter=7%26section=1, pp. 1-11) (Year: 2010).

* cited by examiner

USER INTERFACE FOR VIDEO EDITING SYSTEM

BACKGROUND

Technical Field

The present disclosure relates generally to video editing software applications. More specifically, the present disclosure relates to graphical user interfaces for video editing software applications that, at least in preferred embodiments, provide users with a more efficient workflow environment.

Description of the Related Art

Reference to any prior art in the specification is not an acknowledgment or suggestion that this prior art forms part of the common general knowledge in any jurisdiction or that this prior art could reasonably be expected to be understood, regarded as relevant, and/or combined with other pieces of prior art by a skilled person in the art.

Film and/or video productions are created on video editing systems typically by assembling the project from a collection of constituent elements. Video editing systems allow these constituent elements—which include video clips, audiovisual clips, audio clips and associated metadata—to be separately imported and edited before being merged into the final production. Modern video editing systems (and particularly those used professionally in the film and television industry) include sophisticated video editing software applications. The Applicant's video editing system known as DaVinci Resolve® is an example of a modern video editing system that is extensively used in the professional environment. The total functionality of DaVinci Resolve® is divided into a number of separate pages (each having their own graphical user interface) that are organized in the order of a typical workflow. The DaVinci Resolve® pages include: Media (for media management and clip organization); Edit (a non-linear video editor); Color (for color correction and grading); Sound (a digital audio workstation); and Delivery (for final rendering or output).

In common with other non-linear video editors, the user interface of the Edit page of DaVinci Resolve® includes a timeline that is a graphical representation of the project being edited. The timeline includes a plurality of linearly spaced timecode markings that extend typically in a horizontal direction along the length of the user interface window. The timeline allows the constituent elements of the project to be arranged into the desired temporal order by positioning the element relative to the timeline's temporal markings. Once placed in the timeline, elements can be edited by launching editing tools to perform operations such as trimming, splitting, inserting, merging, and moving of clips to a desired location.

The present disclosure aims to provide a graphical user interface for a video editing system that, at least in preferred embodiments, provides users with a more optimized video editing workflow environment.

BRIEF SUMMARY

According to a first aspect of the present disclosure there is provided a software product including a computer readable medium storing instructions which, when executed by a processor, cause the processor to:

display a graphical user interface for a video editing system, the graphical user interface including first and second spaced apart timelines; and responsive to detecting a user interaction with one of the timelines, apply a corresponding interaction to the other timeline.

The present disclosure provides a graphical user interface for a video editing system that includes first and second linked timelines in which an action taken on one of the timelines is automatically applied to the other. This provides a more flexible or at least an alternative workflow environment in which to conduct video editing and production.

According to one embodiment, the first timeline includes a plurality of linearly spaced temporal markings displayed according to a first scale and the second timeline includes a plurality of linearly spaced temporal makings displayed according to a second scale different from the first scale.

The present disclosure can detect and process a wide variety of user interactions with one of the timelines. For example, the user interaction can be the movement of a playhead relative to one of the timelines. In this scenario, the other timeline's playhead is automatically moved. Preferably, the other timeline's playhead is moved so that it aligns with the same temporal marking as the playhead on the first timeline. In other words, each timeline's playhead refers to the same point in time both before and after the movement.

In another embodiment, the user interaction is moving a playhead relative to one timeline and the applied corresponding interaction is moving the other timeline relative to a second playhead. Preferably in this scenario, the other timeline is moved simultaneously with the playhead.

The user interaction can also involve changing the scale (or "zooming in or out") of one of the timelines. In this scenario, the scale of the other timeline can be automatically changed. Typically, the scale of the other timeline is changed in proportion to the change in scale of the first timeline so that the ratio of the two scales is preserved.

Due to the different scales of the two timelines, it can be advantageous to depict the constituent elements of the production (such as video, audio and audiovisual clips) placed in the two timelines in a different way. For example, the timeline with the larger scale (namely where the same linear distance represents a longer time interval) can depict a video or audiovisual clip in a schematic manner, whereas the other timeline can depict that same clip using the clip's constituent frames.

According to another aspect of the present disclosure there is provided a method for providing a graphical user interface for a video editing system, comprising:

displaying a graphical user interface for the video editing system, the graphical user interface including first and second spaced apart timelines; and responsive to detecting a user interaction with one of the timelines, applying a corresponding interaction to the other timeline.

The present disclosure also provides a video editing system that comprises a processor and a software product according to the first aspect of the disclosure.

As used herein, except where the context requires otherwise, the term "comprise" and variations of the term, such as "comprising," "comprises" and "comprised," are not intended to exclude further additives, components, integers, or steps.

BRIEF DESCRIPTION OF THE SEVERAL VIEWS OF THE DRAWINGS

Further aspects of the present disclosure and further embodiments of the aspects described in the preceding paragraphs will become apparent from the following description, given by way of example and with reference to the accompanying drawings, in which.

DETAILED DESCRIPTION

Figure 1:
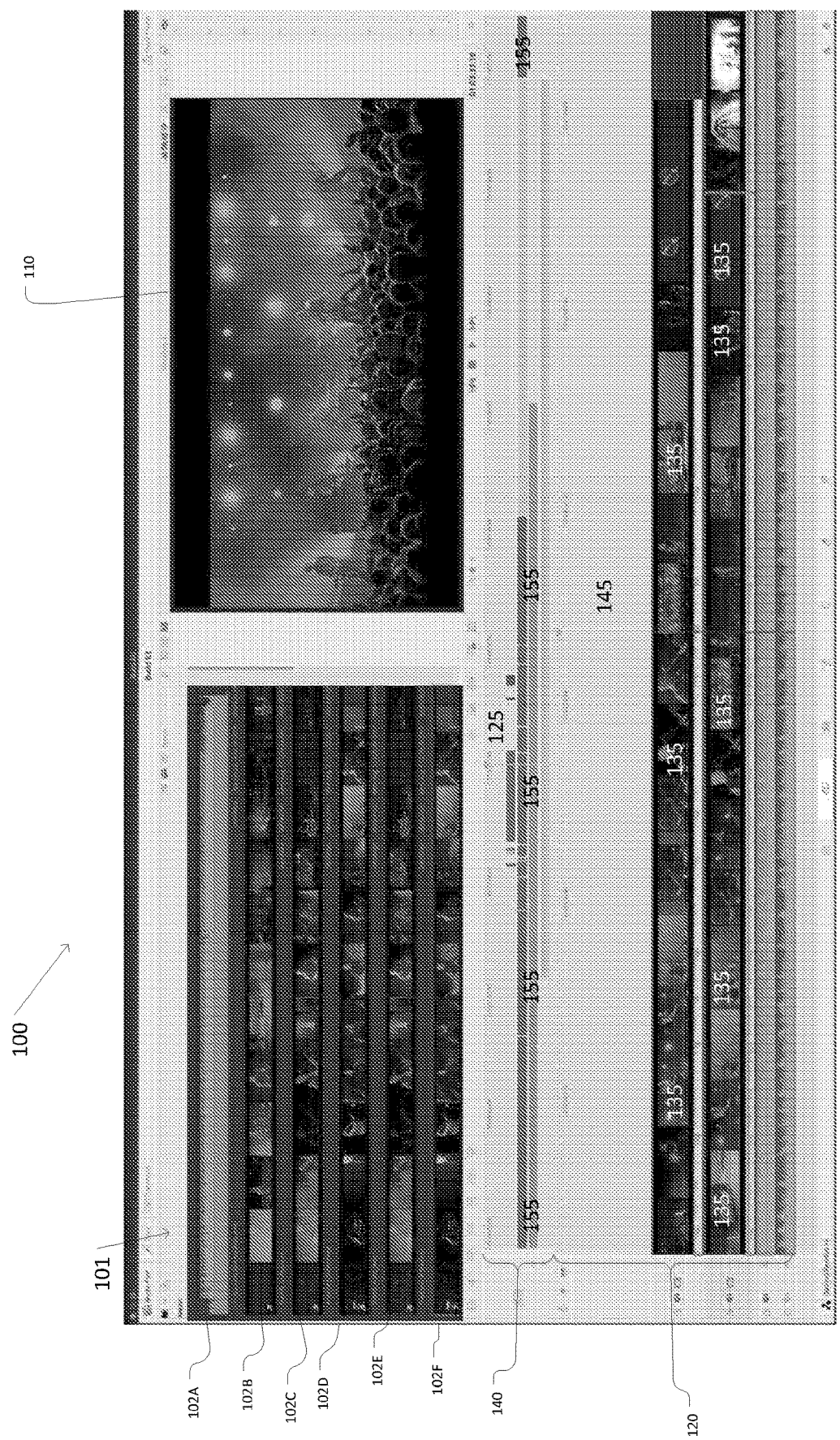
FIG. 1 is an illustration of a first view of a user interface according to an embodiment of the present disclosure.

A user interface 100 for a video editing system that includes a software application is shown in FIG. 1. The video editing software application allows for the creation of projects from component elements of source media that are imported into the system and displayed in a media bin area 101. Six component elements are shown in FIG. 1, comprising an audio track 102A and five audio-visual clips 102B-102F (namely video clips each with a recorded audio track). As understood by skilled addressees, the video editing application also stores and manages metadata for each component element, as well as for the overall project.

User interface 100 is streamlined in only displaying a subset of the usual user interface elements that are displayed on the Edit page of DaVinci Resolve®. For example, user interface 100 does not include a separate viewer window for viewing video and audio-visual clips in the media bin area 101. The streamlined user interface displays the core tools that are needed for certain projects, for example to import media, edit, trim, add transitions and titles, automatically match color and mix audio.

User interface 100 also includes a viewer window 110 for viewing a selected clip (in this case clip 102F), a first timeline 120, and a second timeline 140 lying parallel with the first timeline 120. In this instance, the second timeline 140 lies above the first timeline 120, but it may also be positioned below in other embodiments. First timeline 120 is the familiar timeline from video editing software, namely one that allows for projects to be created by the insertion, editing, and arrangement of source media. In this regard, the individual source media elements 102A-102F can be dragged or otherwise inserted into first timeline 120 from media bin area 101 or viewer window 110. Once in the timeline, the source media elements can be suitably edited and arranged. According to the present disclosure, source media elements can also be suitably inserted into second timeline 140 whereupon they automatically appear in first timeline 120.

The second timeline 140 illustrates the timeline of the entire project of which timeline 120 shows a portion, in magnified form.

Each timeline 120 and 140 includes a respective playhead 145 and 125 that is a graphic line that indicates the current temporal position of the frame of the clip being played in viewer window 110 and in first and second timelines 120 and 140.

Figure 2:
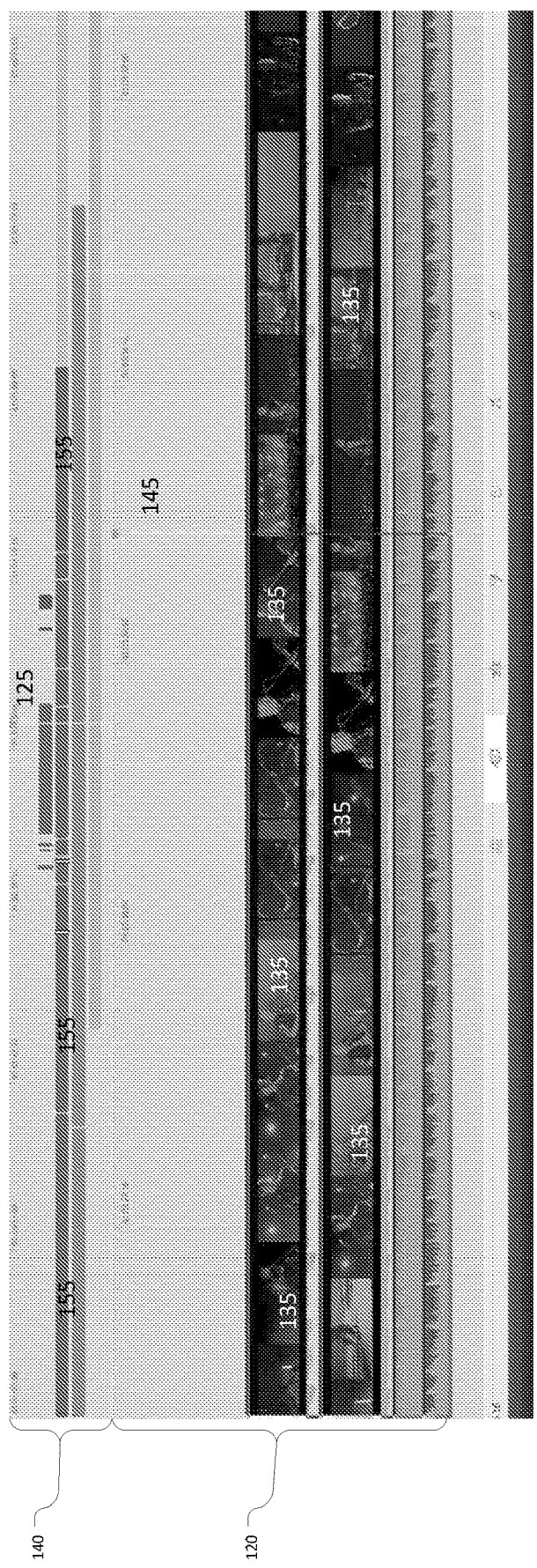
FIG. 2 is an enlarged view of a portion of the user interface shown in FIG. 1.

As illustrated more clearly in FIG. 2, first timeline 120 is divided into regions of uniform length and marked with the timecode units of hours, minutes, seconds, and frames. At the zoom level (or scale) illustrated in FIG. 2, each region of timeline 120 contains two seconds and eight frames of the clip being played, with the clip including 24 frames per second.

Timecodes are marked at a different scale on second timeline 140, with the regions being of a shorter distance than the regions of first timeline 120 as well as including a longer time interval of the clip being played. In this regard, as shown in FIG. 2, each (shorter) region of second timeline 140 contains 51 seconds and eight frames of the clip being played.

By depicting longer time intervals per linear unit length, second timeline 140 is configured to illustrate the entire project within a single window of user interface 100. This provides a higher level perspective of the project's overall structure. On the other hand, the finer scale of first timeline 120 is particularly suitable for viewing the detail of individual clips and performing edits thereon. Simultaneously depicting the two timelines 120 and 140, each with a different scale, allows the overall project structure to be contrasted with the detail of the current element.

In the exemplified embodiment, graphical user interface 100 depicts the component elements present in each of the timelines 120 and 140 in different ways. Doing so can confer certain advantages that arise from the fact that the two timelines 120 and 140 have different scales. More specifically, as noted above timeline 140 has a larger scale than timeline 120 in terms of the length of the time interval represented by a unit of linear distance. As such, timeline 140 is better suited to depicting the overall structure of the project, with the detail of the individual clips being of secondary importance.

This display methodology is manifested in graphical user interface 100 by depicting the elements present in timeline 140 in a schematic manner using solid rectangular shapes 155. Conversely, those same elements are depicted in timeline 120 using a linear series 135 of the individual frames comprising the elements. The elements are vertically stacked in the same order in both timelines 120 and 140. In the illustrated embodiment, this comprises two audiovisual tracks stacked above two audio tracks.

Figure 3:
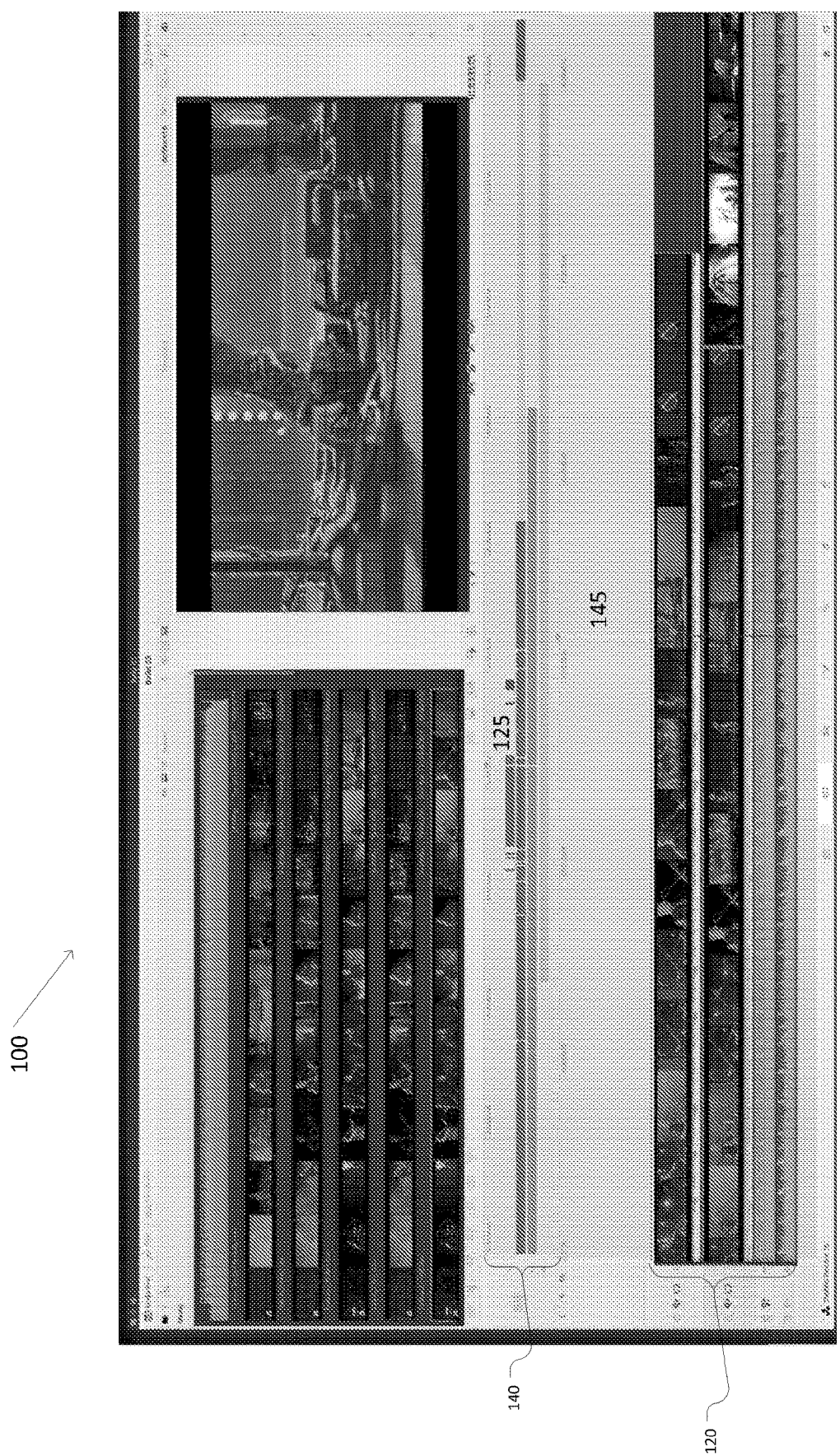
FIG. 3 is an illustration of a second view of a user interface according to an embodiment of the present disclosure.
Figure 4:
FIG. 4 is an enlarged view of a portion of the user interface shown in FIG. 3.

Returning to FIG. 1, graphical user interface 100 allows the user to interact with either of the timelines 120 and 140 in various ways. One such interaction is the movement of one of the playheads 125 to a different location which has the effect of advancing or rewinding the playhead to a different temporal position in the clip being played. Such a movement is illustrated in FIGS. 3 and 4, which show the timecode position of the playheads after being moved from the positon shown in FIGS. 1 and 2 to a different position. For playhead 125 (being in timeline 140), the position shown in FIGS. 3 and 4 is in the region bounded by timecode units 01:03:25:08 and 01:04:16:16. For playhead 145 (being in timeline 120), the position shown in FIGS. 3 and 4 is in the region bounded by timecode units 01:03:34:16 and 01:03:37:00.

Graphical user interface 100 is programmed in a way that user interactions with one of the timelines 120 and 140 is automatically applied to the other timeline. In the case of a playhead movement, movement of one playhead is automatically reflected in the position of the other playhead relative to its particular timeline. This automatic application of user interactions from one timeline to another combines synergistically with the different scales of each timeline 120 and 140. In this regard, the user can readily manipulate the timelines in a way that optimizes the editing workflow. For example, the user can move playhead 125 to quickly navigate to a different position in the overall project, with playhead 145 automatically being moved onto the particular clip that is present in timeline 120 at the new position. Conversely, manipulating playhead 145 allows the user to make more precise temporal-position adjustments, the result of which become immediately viewable in the context of the project as a whole by inspecting the new location of playhead 125 in timeline 140.

In another embodiment, the user can move playhead 125 to navigate to a different position in the overall project, however playhead 145 remains in the same position, for example in the middle of timeline 120. To reflect the change in temporal position, timeline 120 itself is moved relative to (stationary) playhead 145. The movement of timeline 120 occurs simultaneously with the movement of playhead 125. This ensures that playhead 145 points to the same temporal value as playhead 125, both during movement of that playhead, and when the movement is complete.

Another interaction with timelines 120 and 140 that can be facilitated by the present disclosure is changing the scale (or "zooming" in or out) of one of the timelines. Such changes are made by manipulating a suitable graphical user interface element (such as a slider) or pressing a keyboard shortcut provided by or mapped into the video editing system. The user interface can be configured so that a change in scale of one of the timelines has no impact on the other timeline. Other embodiments allow changes in zoom level to be applied to the other time such as by applying a proportional change so that the ratio of the two scales is preserved.

The user interface according to the present disclosure provides an enhanced workflow for operations involving moving a clip from one location in the timeline to another. For example, the user may wish to move the clip that is being edited to the end of the presentation. Previously, such an operation involved selecting the clip, zooming out of the timeline so that the desired position is visible, and then either dragging and dropping or copying and pasting the clip to the desired position. According to the disclosure, such an operation is achieved simply by selecting the clip in timeline 120 and dragging it up to the desired position in timeline 140. Having a larger 'zoomed out' scale, the desired position is already visible in timeline 140.

The two timelines 120 and 140 provide alternative views of the same project. As such, the user interface 100 is programmed to detect the movement of clips from one timeline to the other and apply a suitable operation to the timeline from which the clip was moved. For example, if the user moves a clip from timeline 120 to a particular temporal location on timeline 140, the user interface 100 places a copy of the clip (or a reference to the clip) at that same temporal location in timeline 120. However, being at a smaller scale, the clip in timeline 120 may not be visible to the user until they move the playhead 145 to that temporal location. As noted above, this operation can readily be performed by moving playhead 125 to the desired temporal location, with playhead 145 automatically being moved onto the clip in timeline 120

Figure 5:
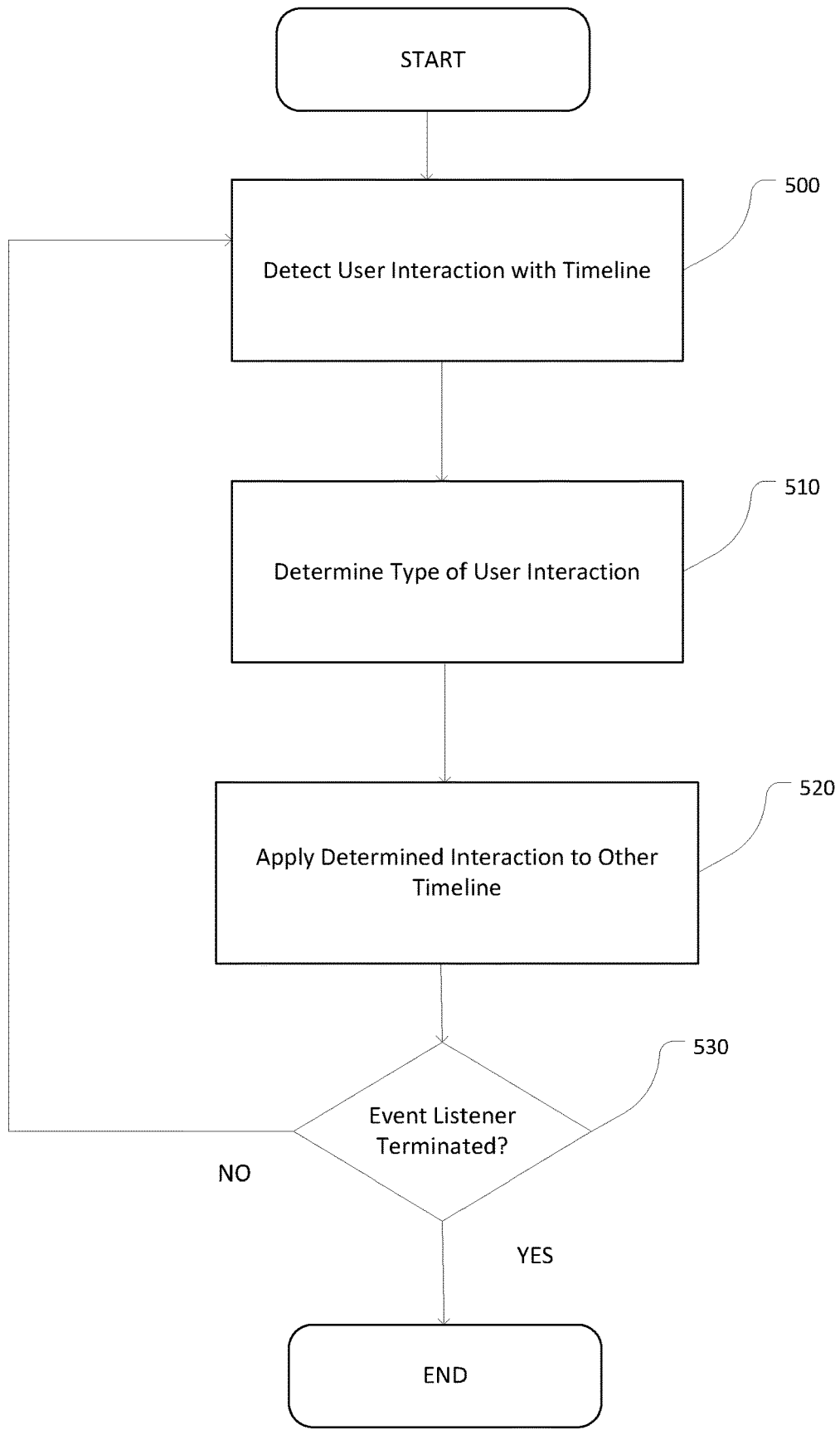
FIG. 5 is a flow chart illustration of an event loop suitable for implementing a graphical user interface feature according to an embodiment of the disclosure.

FIG. 5 illustrates an event loop that is suitable to implement the graphical user interface (GUI) features of the present disclosure. The process commences at step 500, at which a suitable event listener attached to one of first timeline 120 or second timeline 130 receives notification from the underlying GUI framework of an event signifying a user interaction with one of the timelines.

At step 510, the video editing software application queries the event and determines the particular type of user interaction that has occurred. As noted above, examples of user interactions are moving a playhead associated with the timeline and changing the scale of the timeline.

At step 520, the video editing software application applies a corresponding interaction to the other timeline using the methodology set out above.

A determination is made at step 530 of whether the event listener attached to the timeline has been terminated. In the event of a termination, the event loop ceases iteration. Conversely, the event loop returns to step 500 to listen for subsequent events occurring with respect to the timelines.

Figure 6:
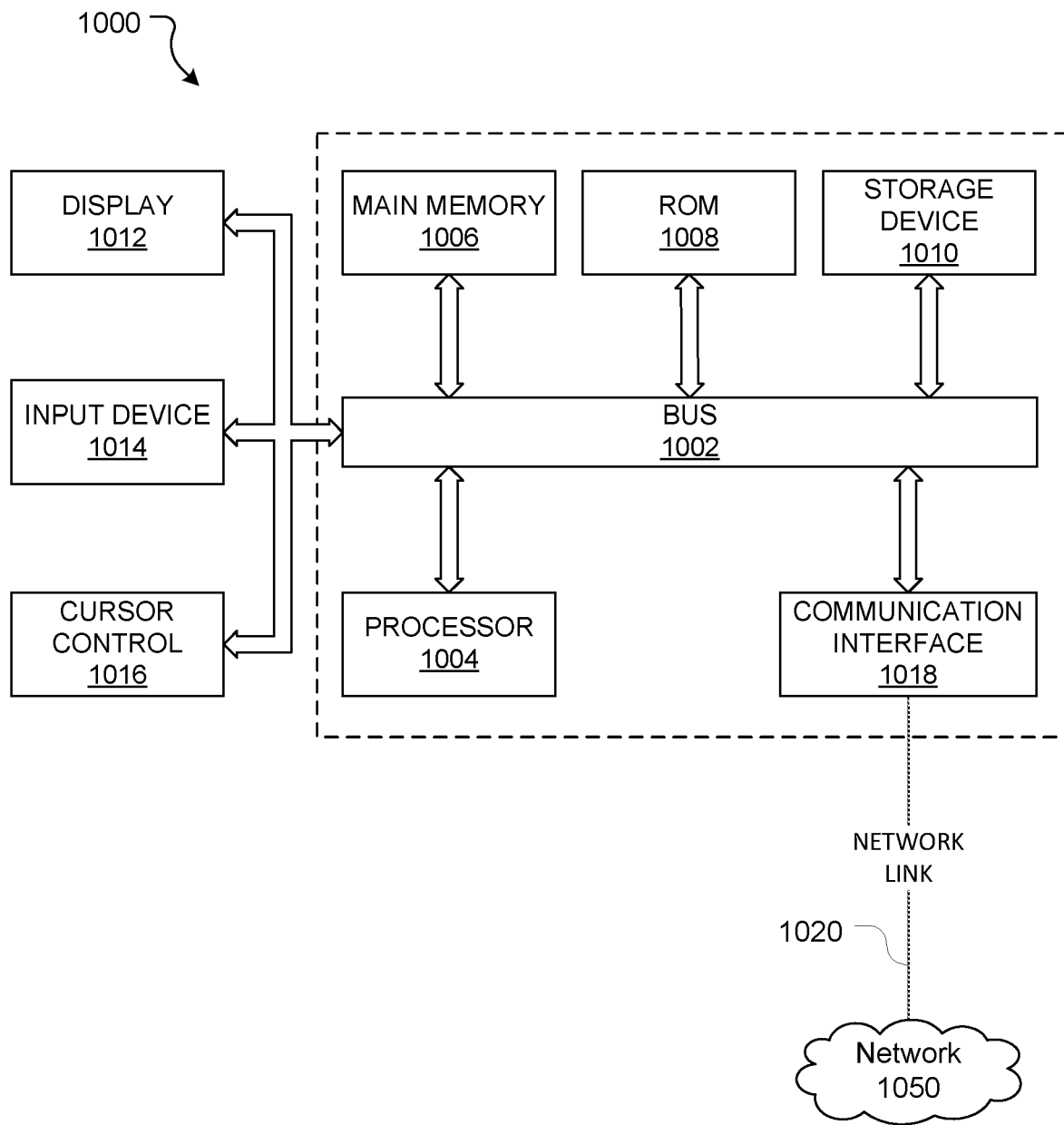
FIG. 6 is a schematic illustration of a hardware environment suitable for implementing the graphical user interface in accordance with an embodiment of the present disclosure.

FIG. 6 provides a block diagram that illustrates one example of a computer system 1000 upon which embodiments of the disclosure may be implemented. Computer system 1000 includes a bus 1002 or other communication mechanism for communicating information, and a hardware processor 1004 coupled with bus 1002 for processing information. Hardware processor 1004 may be, for example, a general purpose microprocessor, a graphics processing unit, other type of processing unit or combinations thereof.

Computer system 1000 also includes a main memory 1006, such as a random access memory (RAM) or other dynamic storage device, coupled to bus 1002 for storing information and instructions to be executed by processor 1004. Main memory 1006 also may be used for storing temporary variables or other intermediate information during execution of instructions to be executed by processor 1004. Such instructions, when stored in non-transitory storage media accessible to processor 1004, render computer system 1000 into a special-purpose machine that is customized to perform the operations specified in the instructions.

Computer system 1000 further includes a read only memory (ROM) 1008 or other static storage device coupled to bus 1002 for storing static information and instructions for processor 1004. A storage device 1010, such as a magnetic disk or optical disk, is provided and coupled to bus 1002 for storing information and instructions including the video editing software application described above.

The computer system 1000 may be coupled via bus 1002 to a display 1012 (such as an LCD, LED, touch screen display or other display), for displaying information to a computer user, such as the graphical user interface described and illustrated above. An input device 1014, including alphanumeric and other keys, may be coupled to the bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012.

According to one embodiment, the techniques herein are performed by computer system 1000 in response to processor 1004 executing one or more sequences of one or more instructions contained in main memory 1006. Such instructions may be read into main memory 1006 from another storage medium, such as a remote database. Execution of the sequences of instructions contained in main memory 1006 causes processor 1004 to perform the process steps described herein. In alternative embodiments, hard-wired circuitry may be used in place of or in combination with software instructions.

The terms "storage media" or "storage medium" as used herein refers to any non-transitory media that stores data and/or instructions that cause a machine to operate in a specific fashion. Such storage media may comprise non-volatile media and/or volatile media. Non-volatile media includes, for example, optical or magnetic disks, such as storage device 1010. Volatile media includes dynamic memory, such as main memory 1006. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Computer system 1000 also includes a communication interface 1018 coupled to bus 1002. Communication interface 1018 provides a two-way data communication coupling to a network link 1020 that is connected to a communication network 1050. For example, communication interface 1018 may be an integrated services digital network (ISDN) card, cable modem, satellite modem, etc. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

It will be understood that the disclosure disclosed and defined in this specification extends to all alternative combinations of two or more of the individual features mentioned or evident from the text or drawings. All of these different combinations constitute various alternative aspects of the disclosure.

In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A non-transitory computer readable medium storing instructions which, when executed by a processor, cause the processor to:
    display a graphical user interface for a video editing system, the graphical user interface including first and second spaced apart timelines within which media elements in a project can be edited and arranged, each of said first and second timelines providing a graphical representation of the project being edited, and wherein each of said first and second timelines provide alternate views of the same project; and
    responsive to detecting a user interaction with one of the first or second timeline, apply a corresponding interaction to the other of the first or second timeline.

2. A non-transitory computer readable medium according to claim 1, wherein the first timeline includes a plurality of linearly spaced temporal markings displayed according to a first scale and the second timeline includes a plurality of linearly spaced temporal makings displayed according to a second scale different from the first scale.

3. A non-transitory computer readable medium according to claim 2, wherein the first and second timelines visually display elements respectively placed thereon differently.

4. A non-transitory computer readable medium according to claim 3, wherein the first or second timeline having a larger scale visually displays media elements placed thereon in a schematic manner.

5. A non-transitory computer readable medium according to claim 1, wherein the user interaction is moving a first playhead relative to the one of the first or second timeline and the applied corresponding interaction is moving a second playhead relative to the other of the first or second timeline.

6. A non-transitory computer readable medium according to claim 5, wherein the second playhead is moved a distance such that it aligns with the value of the temporal marking to which the first playhead is aligned.

7. A non-transitory computer readable medium according to claim 1, wherein the user interaction is moving a first playhead relative to the one of the first or second timeline and the applied corresponding interaction is moving the other of the first or second timeline relative to a second playhead.

8. A non-transitory computer readable medium according to claim 7, wherein the other of the first or second timeline is moved simultaneously with the first playhead.

9. A non-transitory computer readable medium according to claim 1, wherein the user interaction is moving a media element from the one of the first or second timeline to a temporal location on the other of the first or second timeline and the applied corresponding interaction is placing a copy of, or reference to, the media element at a corresponding temporal location on the one of the first or second timeline.

10. A non-transitory computer readable medium according to claim 1, wherein each of said first and second timelines allow the media elements of said project to be arranged into a desired temporal order by positioning said media elements relative to at least one of the first or second timeline.

11. A method for providing a graphical user interface for a video editing system, comprising:
    displaying a graphical user interface including first and second spaced apart timelines within which media elements in a project can be edited and arranged, each of said first and second timelines providing a graphical representation of the project being edited, and wherein each of said first and second timelines provide alternate views of the same project; and
    responsive to detecting a user interaction with one of the first or second timeline, applying a corresponding interaction to the other of the first or second timeline.

12. A method according to claim 11, wherein the first timeline includes a plurality of linearly spaced temporal markings displayed according to a first scale and the second timeline includes a plurality of linearly spaced temporal makings displayed according to a second scale different from the first scale.

13. A method according to claim 12, wherein the first and second timelines visually display elements respectively placed thereon differently.

14. A method according to claim 13, wherein the first or second timeline having a larger scale visually displays media elements placed thereon in a schematic manner.

15. A method according to claim 11, wherein the user interaction is moving a first playhead relative to the one of the first or second timeline and the applied corresponding interaction is moving a second playhead relative to the other of the first or second timeline.

16. A method according to claim 15, wherein the second playhead is moved a distance such that it aligns with the value of the temporal marking to which the first playhead is aligned.

17. A method according to claim 11, wherein the user interaction is moving a first playhead relative to the one of the first or second timeline and the applied corresponding interaction is moving the other of the first or second timeline relative to a second playhead.

18. A method according to claim 17, wherein the other of the first or second timeline is moved simultaneously with the first playhead.

19. A method according to claim 11, wherein the user interaction is moving a media element from the one of the first or second timeline to a temporal location on the other of the first or second timeline and the applied corresponding interaction is placing a copy of, or reference to, the media element at a corresponding temporal location on the one of the first or second timeline.

20. A video editing system comprising:
   a processor; and
   a software product configured to cause the processor to perform a method according to claim 11.

21. A method according to claim 11, wherein each of said first and second timelines allow media elements of a project to be arranged into a desired temporal order by positioning said media elements relative to at least one of the first or second timeline.

22. A method according to claim 11, wherein each of said first and second timelines allow the media elements of said project to be arranged into a desired temporal order by positioning said media elements relative to at least one of the first or second timeline.

* * * * *